United States Patent [19]

Sagi

[11] Patent Number: 5,623,496
[45] Date of Patent: Apr. 22, 1997

[54] APPARATUS AND A METHOD FOR SETTING STATION-IDENTIFYING INFORMATION IN A STATION OF A COMMUNICATION SYSTEM

[75] Inventor: Yasuo Sagi, Kawasaki, Japan

[73] Assignee: Fujitsu Limited, Kanagawa, Japan

[21] Appl. No.: 508,484

[22] Filed: Jul. 28, 1995

[30] Foreign Application Priority Data

Dec. 1, 1994 [JP] Japan ..................... 6-298161

[51] Int. Cl.⁶ ..................... H04J 3/24
[52] U.S. Cl. ..................... 370/475; 455/34.1
[58] Field of Search ............... 455/31.1, 34.1, 455/38.1, 88; 370/79, 92, 95.1, 110.1

[56] References Cited

U.S. PATENT DOCUMENTS 5,387,905  2/1995  Grube et al. .................. 370/92
5,517,681  5/1996  Talarmo .................. 455/34.1

FOREIGN PATENT DOCUMENTS

4-255134  9/1992  Japan .

Primary Examiner—Benedict V. Safourek

[57] ABSTRACT

An apparatus for setting an ID number in a station of a communication system in which a multiplexed signal including a preliminary signal and a control information signal comprising the ID number is interchanged between the adjacent stations of stations connected in series, and the stations are respectively responsive to the control information signal having the same ID number as that set in the station, for controlling the station. The apparatus provides a centralized supervisor and in the station, an ID setting circuit and a switching circuit. The centralized supervisor sends to one of the stations, a control information signal including the ID number and an ID set command. The ID setting circuit sets the ID number by storing the ID number included in the received control information signal in a memory device. The switching circuit transfers the received control information signal to the succeeding first station by switching on a path along which the control information signal is carried after the ID number has been set.

22 Claims, 9 Drawing Sheets

STATION B, C

FIG.9

APPARATUS AND A METHOD FOR SETTING STATION-IDENTIFYING INFORMATION IN A STATION OF A COMMUNICATION SYSTEM

BACKGROUND OF THE INVENTION

1. Field of the Invention

The present invention relates to a radio communication system which includes a centralized supervisory station and a plurality of terminal stations and repeater stations connected in series with each other by radio, or more particularly to an apparatus and a method for setting station-identifying information in a station within the communication system. A supervision/control device, which is provided in each of the terminal stations and repeater stations, performs a supervision/control processing according to a supervision/control signal transmitted from the centralized supervisory station and propagated in series through the stations.

The supervision/control signal, which includes station-identifying information (hereinafter called an ID number), is directed to a station having the ID number set exclusively for the station. Thus, when a station is added in the communication system or the ID number is changed for a station, for example, the ID number need be newly set in the supervision/control device. Accordingly an economical and reliable apparatus and method for setting the ID number in the supervision/control device is in great demand.

2. Description of the Related Art

Figure 1:
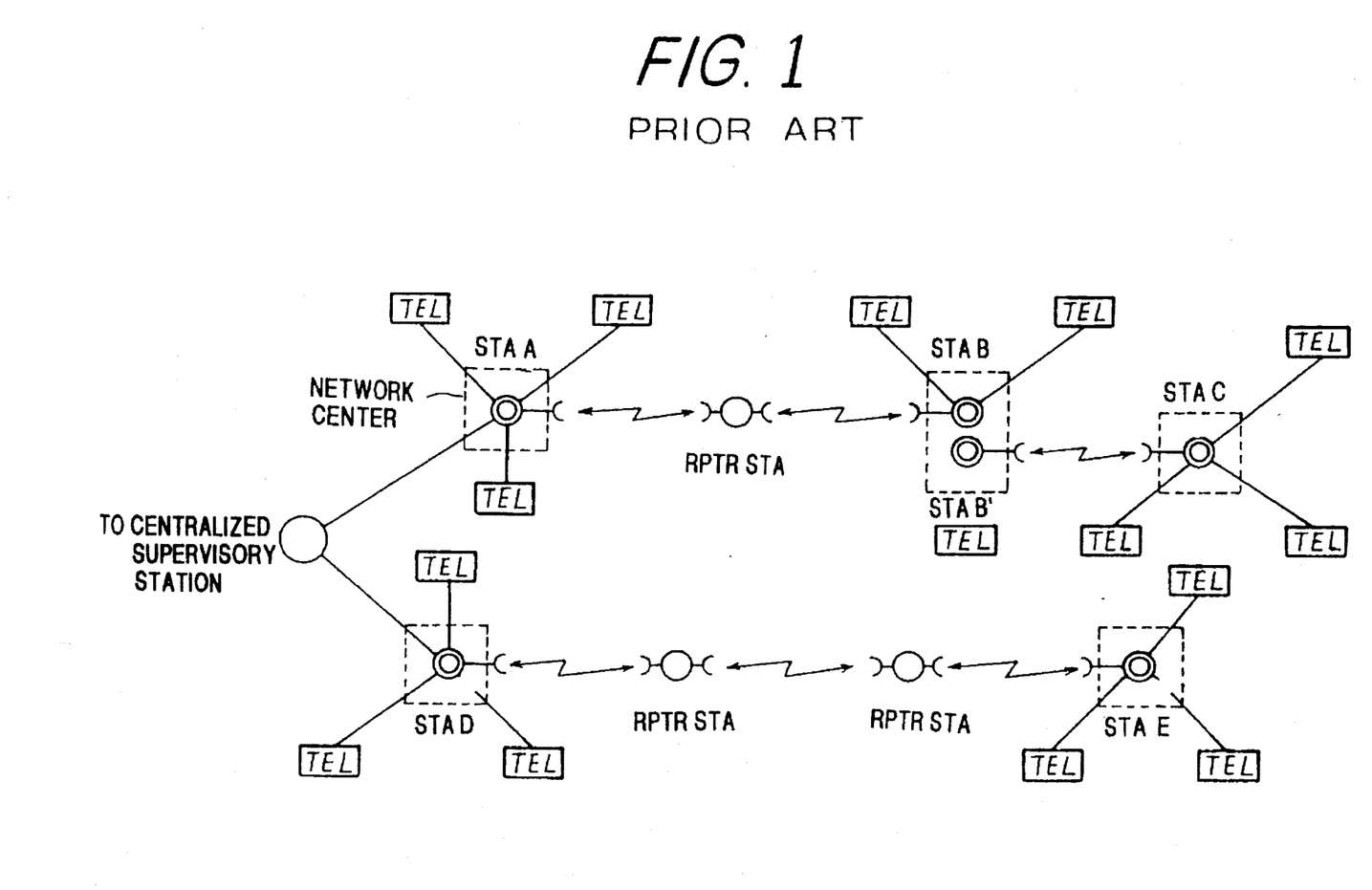
FIG. 1 is a diagram illustrating a radio communication system.

FIG. 1 is a diagram illustrating a radio communication system.

Stations A and D, which are connected directly (by wire) to a centralized supervisory station by wire (e.g., telephone line) are called high-ranking terminal stations. Stations B and E, which are connected to the stations A and D, respectively by radio via repeater stations, are called a low-ranking terminal stations. A station B', which locates in the same network center as the station B and is connected directly (not via a repeater station) to a station C by radio, is called a high-ranking terminal station, while the station C is called a low-ranking terminal station.

In general, when subscribers communicate with each other in a communication system by wire or wireless (i.e., radio), a signal (e.g., audio or data signal) is transmitted from a subscriber through a subscriber's line to a network center and therefrom is transmitted through an exchange and a multiplexer provided in the network to a high-ranking terminal station (e.g., terminal station A). In the high-ranking terminal station, the aforesaid signal transmitted from the subscriber (hereinafter called a preliminary signal) is multiplexed with a supervisory/control signal sent from the centralized supervisor station.

In case of a radio communication system, the multiplexed signal is modulated by a carrier of radio frequency (e.g., 11 giga-hertz frequency band), i.e., converted into a radio frequency signal to be transmitted from an antenna. The radio frequency signal is received by the low-ranking terminal station (e.g., station B) through a repeater station.

The repeater station receives the radio frequency signal, separates the preliminary signal and the supervisory/control signal from the received signal and cheeks the ID number to see whether the supervision/control signal is directed to the station. If so, the repeater station performs supervision/control processing according to the signal and returns a response to the centralized supervisory station. Otherwise, it does not perform any processing or return a response and instead, multiplexes the separated preliminary signal and supervisory/control signal as originally was or with supervisory/control information of its own adding to the supervisory/control signal. Then, the repeater station converts the multiplexed signal into a radio-frequency signal to transmit from an antenna to a low-ranking terminal station or another repeater station.

A low-ranking terminal station, for example, receives the radio-frequency signal, separates the preliminary signal and the supervisory/control signal from the received radio-frequency signal to transfer the preliminary signal to a subscriber. In the same way as the repeater station, when the supervisory/control signal is directed to the terminal station itself, it performs the processing according to the supervisory/control signal and returns a response to the centralized supervisory station.

Thus, the supervisory/control signal is transmitted from the centralized supervisory station, bit-serially and in common to all the stations, through a high-ranking terminal station and a repeater station to a low-ranking terminal station. Accordingly, each station is required to have a function to determine whether the received supervisory/control signal is directed to the station itself.

To achieve the function, each station has a supervision/control device, which has an ID number of its own set therein for identifying itself, compares an ID number included in the received supervisory/control signal with the ID number of its own and, depending on a match/mismatch, determines whether the received supervisory/control signal is directed to the station.

Figure 2:
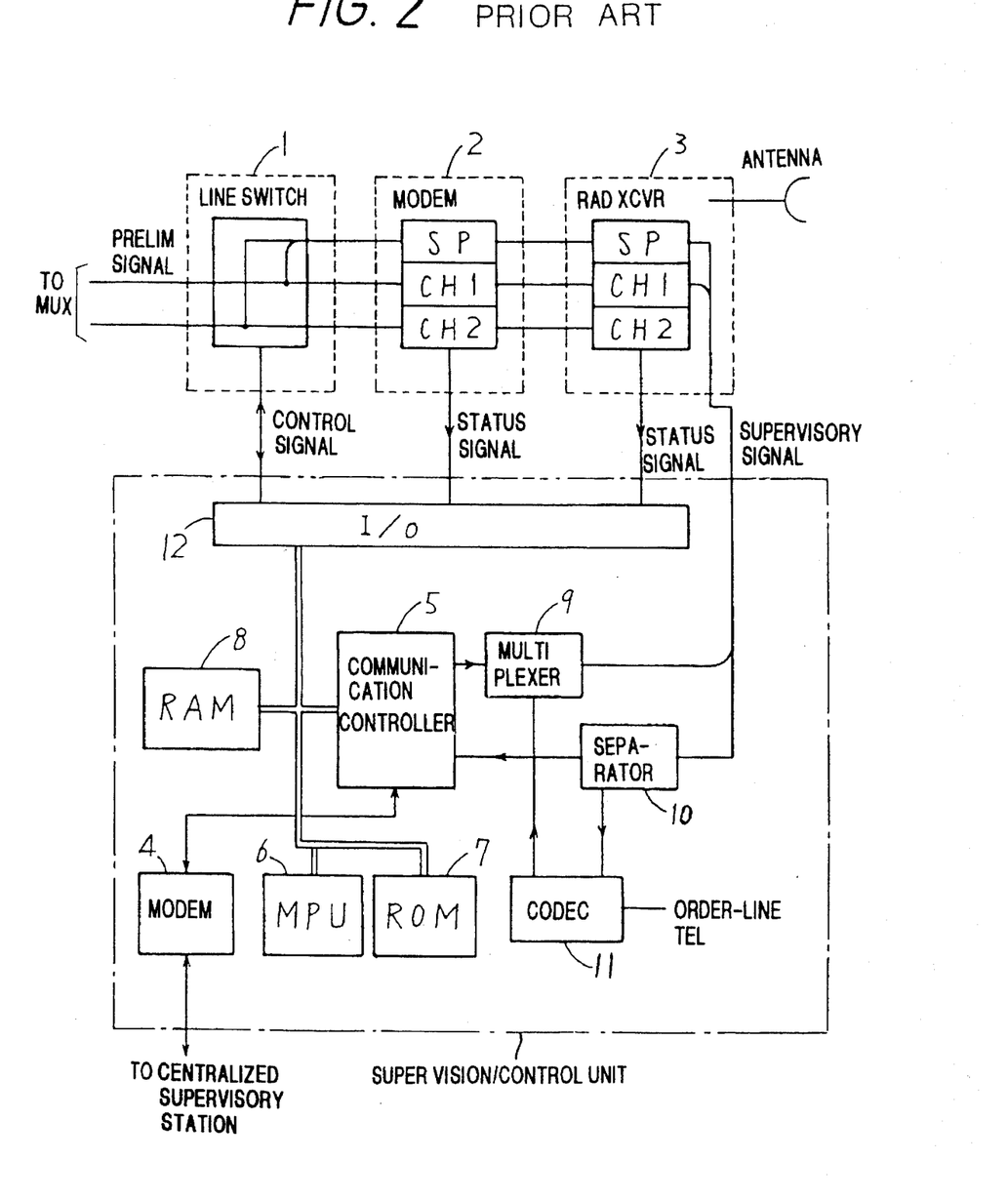
FIG. 2 is a diagram illustrating the configuration of a terminal equipment, in which the present invention is implemented.

FIG. 2 is a diagram illustrating the configuration of a terminal equipment, particularly of a high-ranking terminal station (e.g., station A in FIG. 1) that is connected by wire to the centralized supervisory station by wire, in which equipment the present invention is implemented.

A line switching unit 1 switches a regular line (CH1 or CH2) to an alternative line (SP) according to a control signal sent from a supervisory/control device (described later) when a failure occurs in one of the regular lines. A modem 2 modulates and demodulates the preliminary signal. A radio transceiver 3 multiplexes the preliminary signal modulated by the modem 2 and the supervisory/control signal and sends the multiplexed signal via the antenna as a radio signal. It also separates the preliminary signal and the supervisory/control signal from a radio signal received via the antenna and outputs the signals to the modem 2 and the supervisory/control device, respectively.

The system components enclosed by chain lines constitute the supervision/control device which the present invention relates, comprises a modem 4, a communication controller 5, a microprocessor unit (MPU) 6, a read-only memory (ROM) 7, a random access memory (RAM) 8, a multiplexer 9, a separator 10, a codec 11 and an input/output port (I/O) 12.

The ROM 7 stores a control program for controlling the operations of the supervision/control device. The MPU 6 controls the system components by executing instructions constituting the program stored in ROM 7. The RAM 8 temporarily stores data being processed by the system components.

The communication controller 5 converts the bit-serial supervision/control signal, which is input according to a protocol from the centralized supervisory station through the modem 4, into a parallel data signal to place the data on the system bus. It also converts the parallel data input from the system bus into a bit-serial data signal to send the signal through the modem 4 to the centralized supervisory station.

The I/O 12 receives status information (e.g., alarm signal) from the line switching unit 1, modem 2 and radio transceiver 3 and sends a control signal to the line switching unit 1, to command that a regular line (CH1 or CH2) be switched to the alternative line (SP).

A conventional supervision/control device was provided with a panel (not shown) having a setting board on which a jumper wire was placed to provide the ID number proper to the station. When a new station is installed in a communication system or when the panel fails, for example, the ID number need be newly set or re-set. In a conventional method, however, a customer engineer had to set the ID number manually at the site, even of an unmanned repeater station.

Therefore, it is a problem that the ID number setting work is time-consuming and troublesome. It is another problem that the ID number may be set erroneously, causing a trouble to the communication system.

SUMMARY OF THE INVENTION

It is an object of the present invention to provide an economical and reliable apparatus and method for setting the ID number in a station. It is another object of the present invention to provide an apparatus and method for setting the ID number in a station which can cope flexibly with a change in system configuration.

To achieve the above and other objects, the present invention provides sending means, setting means, storage means and transfer means in an apparatus for setting station-identifying information in a first station of a communication system including a second station and a plurality of the first stations connected in series, the second station interchanging control information with one of the first stations, and the first stations interchanging between adjacent ones thereof, a multiplexed signal of a preliminary signal and a control information signal including the station-identifying information and being respectively responsive to the control information signal including the same station-identifying information as that set in the station, for controlling the station and adding control information to the control information signal.

The sending means, which is provided in the second station, sends to the first station, a control information signal including the station-identifying information and a command instructing the station-identifying information be set.

The setting means, which is provided in the first station, stores in the storage means, the station-identifying information included in the received control information signal.

The transfer means, which is provided in the first station, transfers the received control information signal to the succeeding first station after the station-identifying information has been set by said setting means by bypassing the setting means.

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 3:
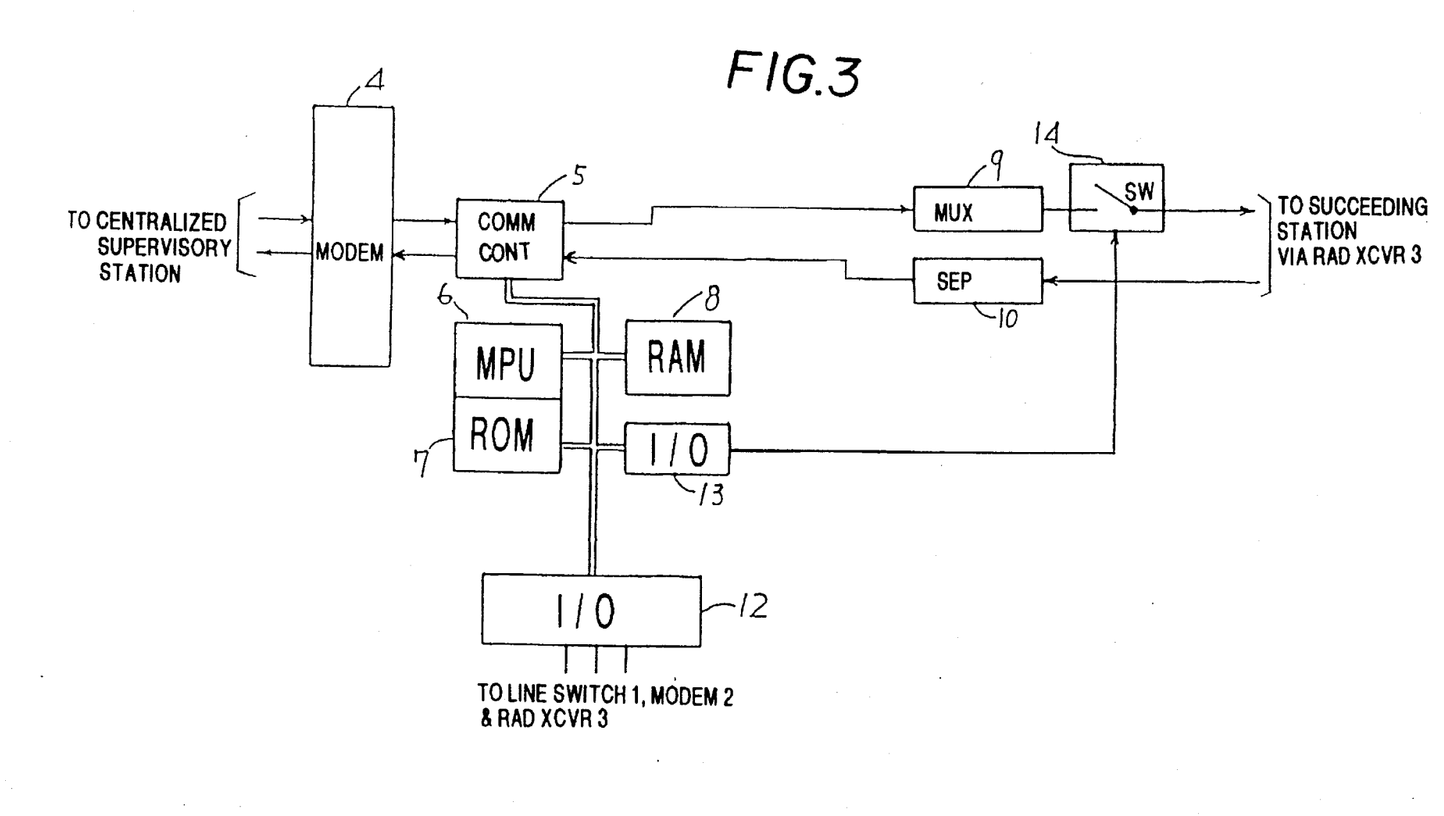
FIG. 3 is a block diagram illustrating a supervision/control device of the first embodiment practicing the present invention.

FIG. 3 is a block diagram illustrating a supervision/control device of the first embodiment practicing the present invention. The first embodiment is explained, taking a high-ranking station for an example, which station is connected directly by wire to the centralized supervisory station.

The supervision/control device of the first embodiment is provided with a switching circuit 14 and an input/output port (I/O) 13. The analog, bit-serial supervision/control signal sent from the centralized supervisory station by wire is analog-to-digital converted by the modem 4 and then, serial-to-parallel converted by the communication controller 5.

While the ID number has not yet been set in the terminal station concerned, the output of the I/O 13 is held at a HIGH, for example, to keep the switching circuit 14 open-circuited (OFF), thus preventing the supervision/control signal from propagating to a succeeding station (repeater station or low-ranking terminal station). The centralized supervisory station sends an ID SET command and an ID number as a supervision/control signal.

Recognizing that the ID SET command and ID number are received by the communication controller 5, the control program stores in an ID storage area (not shown) of the RAM 8, the ID number and a flag bit which indicates that the ID number is set in the area. It then outputs to the communication controller 5, a response signal indicating the completion of ID number setting. The communication controller 5 converts the parallel response signal into a bit-serial signal to transmit the response to the centralized supervisory station via the modem 4. Thereafter, the control program controls the I/O 13 so as to output a low level to keep the switching circuit 14 closed (ON), thus allowing the supervision/control signal sent from the supervisory station to propagate to a succeeding station via the radio transceiver 3.

Accordingly, until setting of an ID number has been completed in the station concerned, the ID SET command is not propagated from the station to a succeeding station. The aforesaid switching circuit 14 may be constructed by a mechanical switch or a transistor. On completion of setting the ID number in a high-ranking station, the centralized supervisory station proceeds to succeeding stations (i.e., repeater station or low-ranking terminal station) by sending the ID SET command while sequentially changing the ID number. Thus, the ID numbers are set in all the stations included in the communication system. Thereafter, each station compares the ID number sent from the centralized supervisory station with the thus-set ID number of its own and, only when the numbers match, performs an operation as commanded by the centralized supervisory station.

Figure 4:
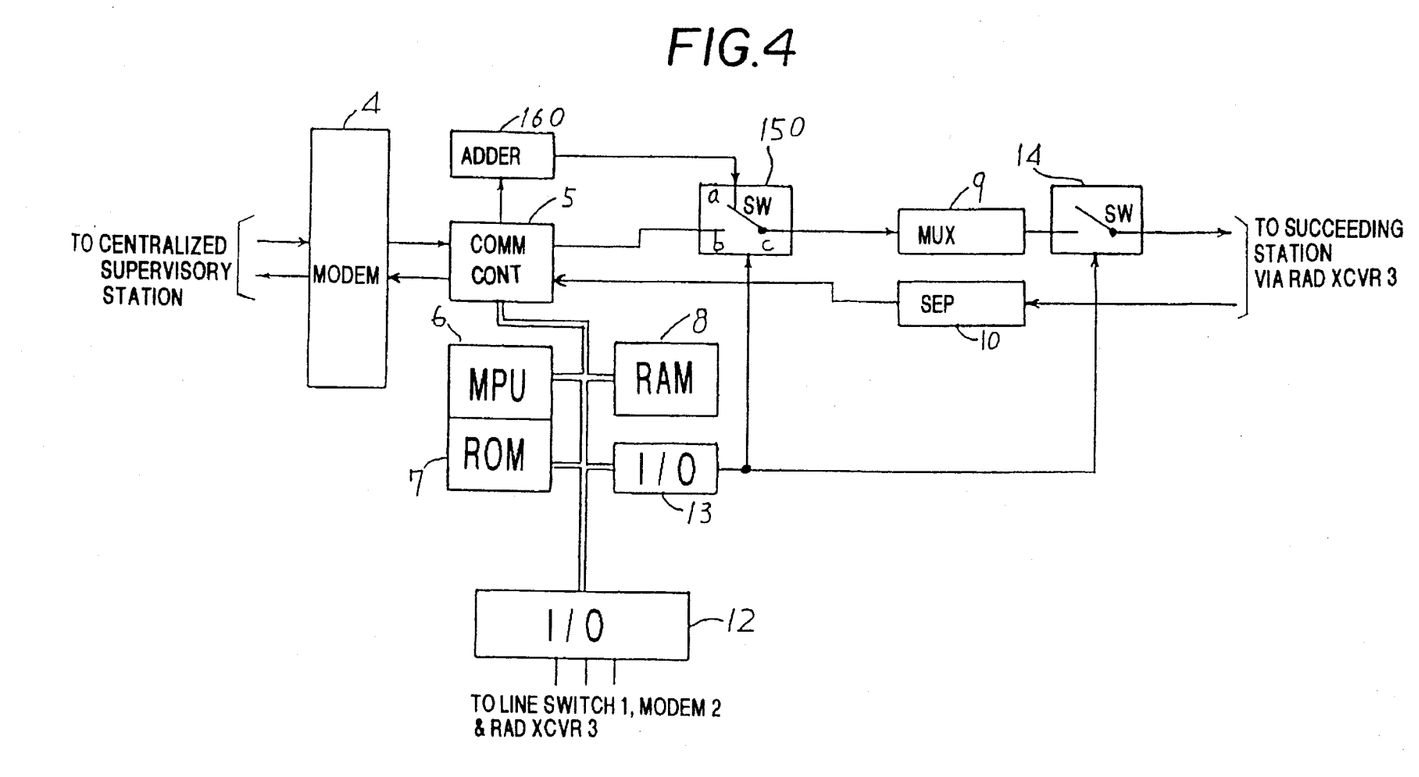
FIG. 4 is a block diagram illustrating a variation of the supervision/control device of the first embodiment.

FIG. 4 is a block diagram illustrating a variation of the supervision/control device of the first embodiment. The supervision/control device shown in FIG. 4 has an adder 160 and a switching circuit 150 added to the circuit shown in FIG. 3. The variation is intended, prior to setting the ID number according to the first embodiment, to recognize the number of stations which are powered and ready to operate in the communication system.

The switching circuit 150 has contacts a, b and c connected to an output of the adder 160, an output of the communication controller 5 and an input of the multiplexer 9, respectively. A number (e.g., zero) accompanied by an ADD command is sent from the centralized supervisory station as a supervision/control signal, and is received by the communication controller 5. The adder 160 adds a predetermined value (e.g., one) to the aforesaid number (i.e., zero) to produce an addition result.

When the ID number has not yet set in the station concerned, the switching circuit 14 is closed and the contact c of the switching circuit 150 is connected to the contact a, i.e., to the output of the adder 160. Thus, the addition result is transmitted along with the ADD command, to the succeeding station through the multiplexer 9 and radio transceiver 3. The addition result is also returned to the the centralized supervisory station as a response signal. The communication controller 5 parallel-to-serial converts the response signal into a bit-serial signal to transmit the response to the centralized supervisory station via the modem 4. Thereafter, the contact c of the switching circuit 150 is connected to the contact b, i.e., to the communication controller 5. Thus, the addition result is propagated through the stations while being raised by a predetermined value in each station.

Accordingly, based on the response signal, the centralized supervisory station can recognize the number of stations included in the system and the power-on/off state of each station and thereafter, performs the ID-setting according to the first embodiment. The aforesaid adder 160 may be constructed either by hardware or software.

Figure 5:
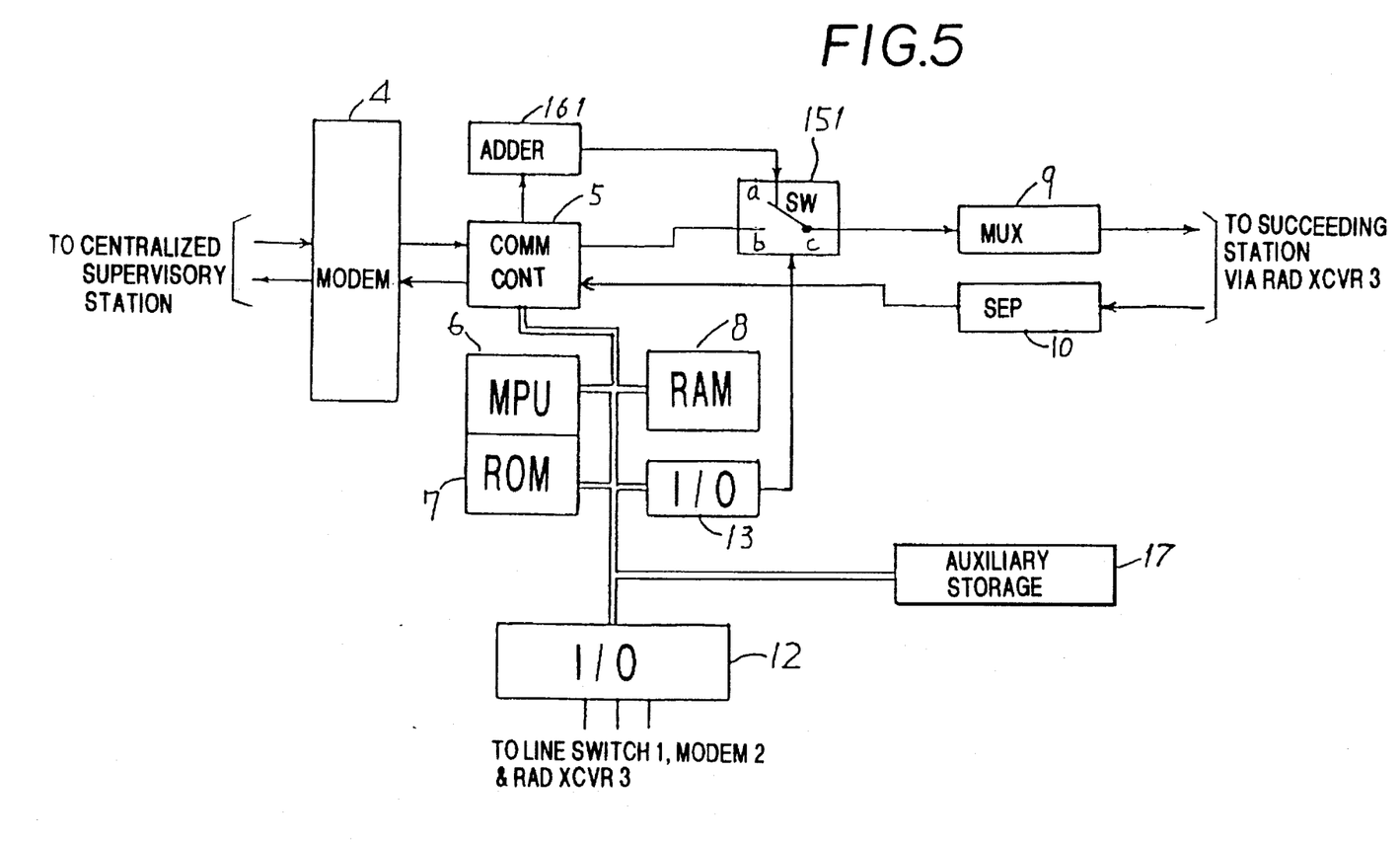
FIG. 5 is a block diagram illustrating a supervision/control device of the second embodiment practicing the present invention.

FIG. 5 is a block diagram illustrating a supervision/control device of the second embodiment practicing the present invention. The second embodiment is explained, taking a high-ranking station for an example, which station is connected directly by wire to the centralized supervisory station. The supervision/control device of the second embodiment is provided with an adder 151 and a switching circuit 161 having contacts a, b and c.

A number (e.g., zero) accompanied by an ID SET is sent from the centralized supervisory station as a supervision/control signal, and is received by the communication controller 5. When the ID number has not yet been set in the station concerned, the contact c is connected to the contact a, i.e., to the output of the adder 161. The adder 161 adds a predetermined value (e.g., one) to the number received by the communication controller 5 to produce an addition result. The addition result and a flag bit are stored in an ID storage area (not shown) of the RAM 8, as the ID number and as an indication that the ID number is set, respectively.

The addition result is also transmitted to the succeeding station by radio through the multiplexer 9 and radio transceiver 3. Then, a response signal indicating completion of ID number setting is output to the communication controller 5. The communication controller 5 converts the parallel response signal into a bit-serial signal to transmit the response to the centralized supervisory station via the modem 4.

In case of a low-ranking terminal station, the response signal is transmitted upward as the supervision/control signal to a preceeding station (i.e., terminal station or repeater station) by radio from the antenna through the radio transceiver 3, after being multiplexed with the preliminary signal by the multiplexer 9. Thus, the response signal is transmitted by radio through the preceeding station and the high-ranking terminal station, and therefrom to the centralized supervisory station by wire. Thereafter, the I/O 13 is controlled so that the switching circuit 151 connects the contact c to the contact b, i.e., to the communication controller 5.

Accordingly, the ID number is automatically set in each station while increasing in number, starting with the number sent from the centralized supervisory station along with the ID SET command. Since the addition result is returned in this embodiment, too, the centralized supervisory station can recognize the number of stations included in the system and the power-on/off state of each station.

The supervision/control unit may have an auxiliary storage 17 (e.g. magnetic disk device) for saving the ID number in the first and second embodiment. Even if the ID number in the RAM 8 is destroyed due to a power failure, supervision/control device can restore the ID number from the auxiliary storage 17, eliminating the necessity of the process to re-execute the ID setting throughout the stations in the communication system and therefore, allowing the system to restart quickly.

Figure 6:
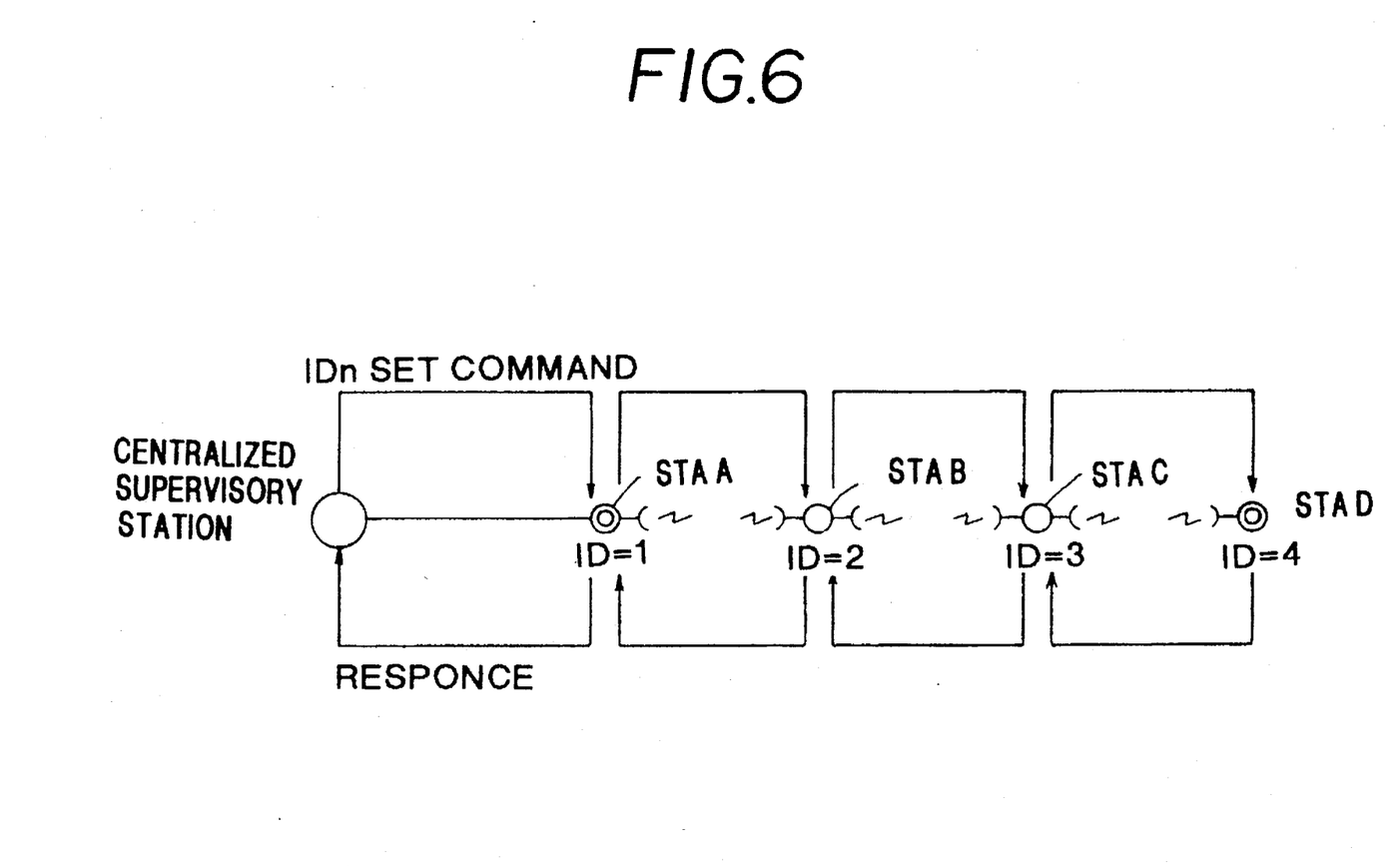
FIG. 6 is schematic diagram of a communication system illustrating an operation of the ID setting of the present invention.
Figure 7:
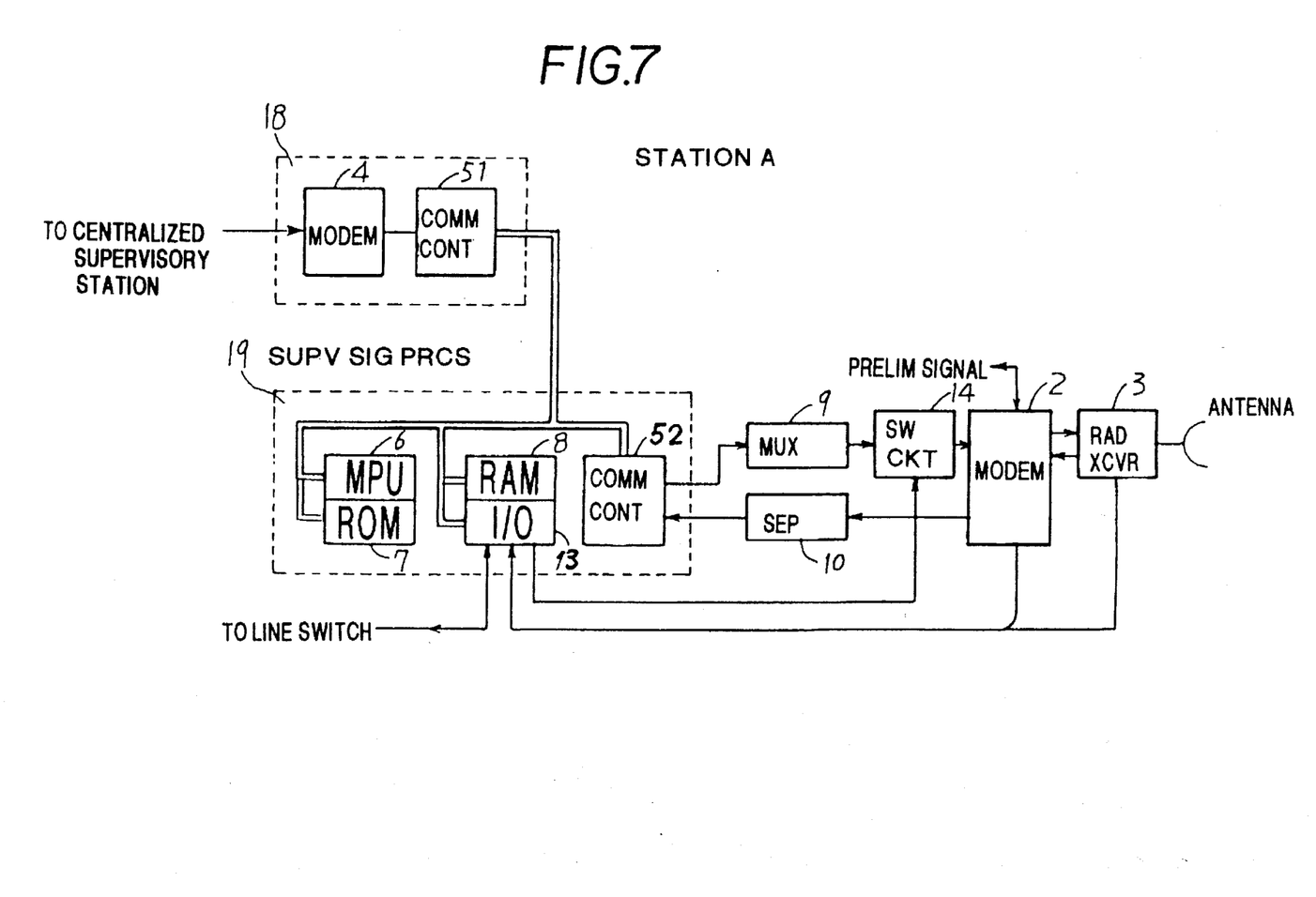
FIG. 7 is a block diagram illustrating a high-ranking terminal station A shown in FIG. 6.
Figure 8:
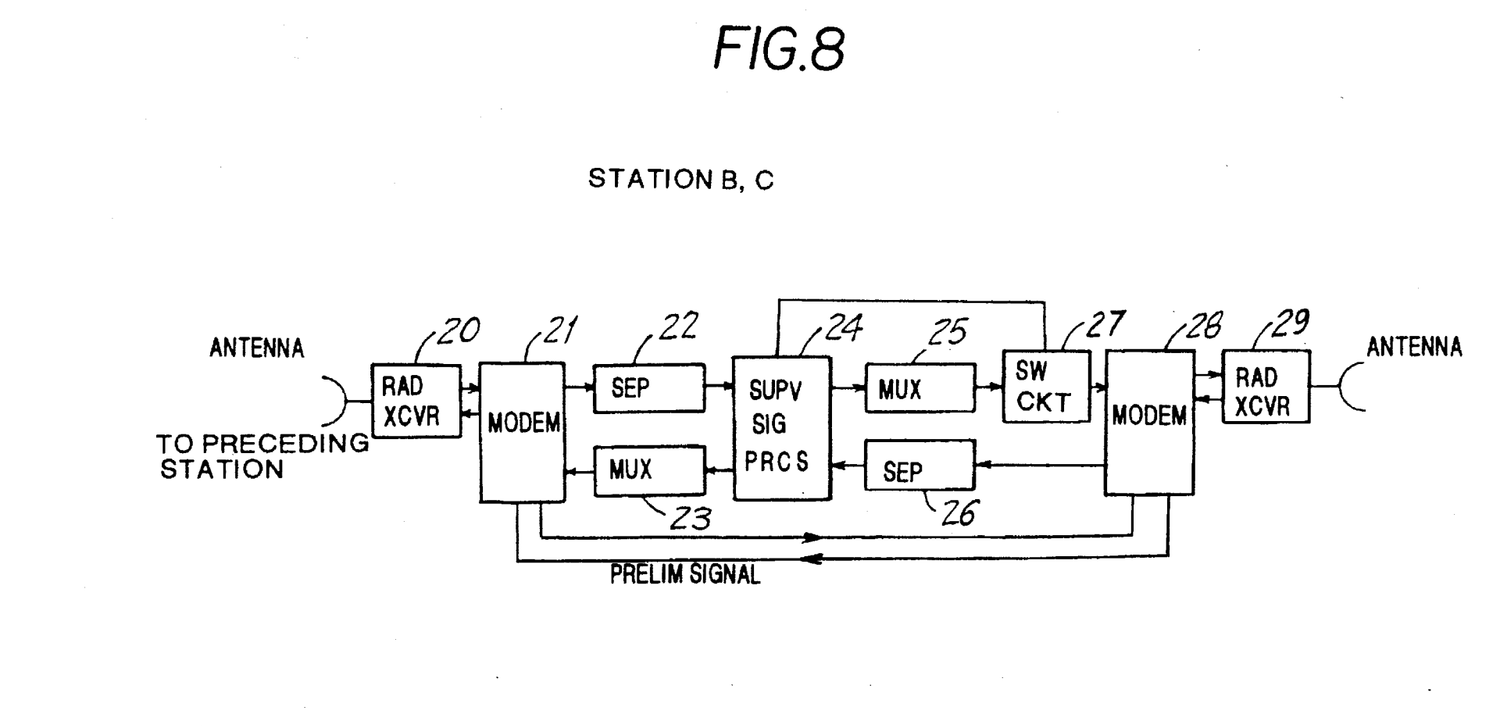
FIG. 8 is a block diagram illustrating a repeater station B or C station shown in FIG. 6.
Figure 9:
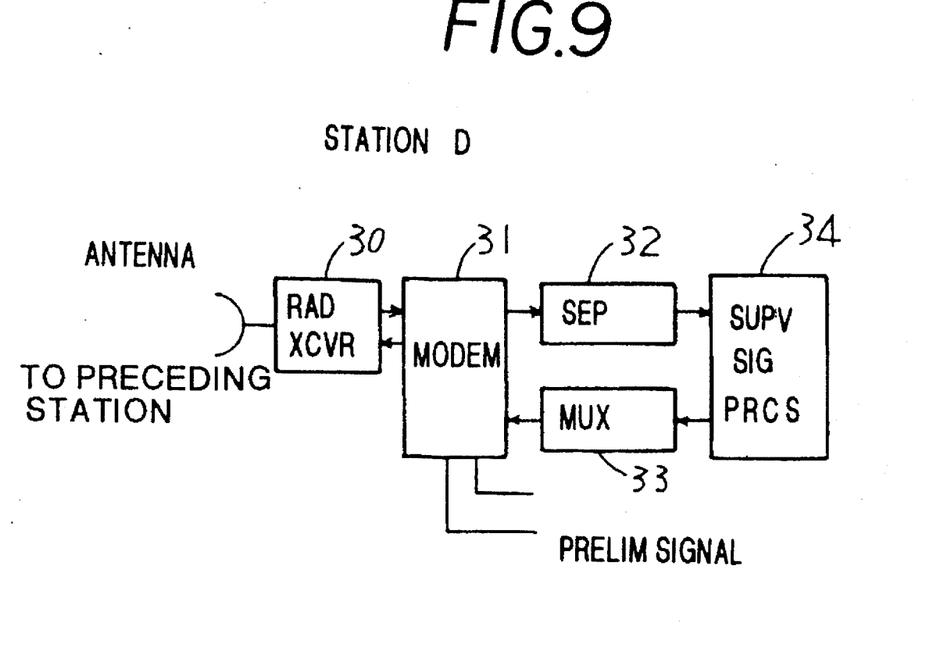
FIG. 9 is a block diagram illustrating a low-ranking terminal station D shown in FIG. 6.

FIG. 6 is schematic diagram of a communication system illustrating an operation of the ID setting of the present invention. FIG. 7 is a block diagram illustrating a high-ranking terminal station A shown in FIG. 6. FIG. 8 is a block diagram illustrating a repeater station B or C station shown in FIG. 6. FIG. 9 is a block diagram illustrating a low-ranking terminal station D shown in FIG. 6.

FIG. 6 illustrates schematically an operation in which an ID SET command accompanied by a number n (n=1, 2, . . .) (abbreviated to IDn SET command) is sent from the centralized supervisory station; each station sets the number as the ID number (ID=1, 2, . . .) and returns a response signal to the centralized supervisory station. The operation is detailed referring to FIGS. 7–9.

First, the centralized supervisory station (see FIG. 6) sends an ID SET command accompanied by a number 1 (hereinafter abbreviated to ID1 SET commend) to a station A. In the station A (see FIG. 7), the received ID1 SET command is converted to a digital and parallel signal through the modem 4 and communication controller 51, respectively and is input to a supervisory signal processor 19 (enclosed by a dotted line).

Recognizing that an ID number has not yet been set by referring to the ID storage area flag bit of the RAM 8 (or to the I/O 13), the control program stores the the ID number 1 in the RAM 8. Then, the control program returns a response signal indicating the completion of ID setting, to the centralized supervisory station through the communication controller 51 and modem 4 and closes the switching circuit 14. On receipt of the response signal, the centralized supervisory station sends an ID2 SET command in return.

Since the station A has the switching circuit 14 closed with the ID number already set therein, the ID2 SET command bypasses the station A to the succeeding station B. That is, the received ID2 SET command is converted into a parallel signal through the modem 4 and communication controller 51 to be input to the supervisory signal processor 19, where no processing takes place because the ID number is already set but instead, the parallel signal is converted into a serial signal by the communication controller 52. The serial ID2 SET command signal is multiplexed with the preliminary signal by the multiplexer 9. Then, the multiplexed ID2 SET command signal passes through the closed switching circuit 14, converted into an analog signal by the modem 2 and further into a radio signal by the radio transceiver 3 to be transmitted from the antenna to the succeeding station B.

In the repeater station B (see FIG. 8), the radio signal transmitted from the station A is received by an antenna and input through a radio transceiver 20 to a modem 21, where the supervision/control information and the preliminary signal are separated. A separator 22 separates the ID2 SET command signal from the supervision/control information signal and based on the separated ID2 SET command, a supervisory signal processor 24 sets the number 2 as the ID number. Then, the supervisory signal processor 24 sends a response signal to the preceeding station via a multiplexer 23 and the modem 21, radio transceiver 20 and antenna. Thereafter, the supervisory signal processor 24 switches the switching circuit 27 from OFF to ON. The response signal sent from the station B goes through the station A to the centralized supervisory station.

Next, on receipt of the response signal from the station B via the station A, the centralized supervisory station sends an ID3 SET command. In the same way as described above, the ID3 SET command bypasses the stations A and B to the succeeding station C (repeater station), where the number 3 is set as the ID number and a response signal is sent toward the centralized supervisory station. On receipt of the response signal from the station C via the stations B and A, the centralized supervisory station sends an ID4 SET command.

Similarly in the station D (low-ranking terminal station) shown in FIG. 9, the ID4 SET command signal is input through an antenna, radio transceiver 30, modem 31, separator 32 to a supervisory signal processor 24. The number 4 is set as the ID number and a response signal is returned through a multiplexer 33 in the reverse order to the centralized supervisory station. The aforesaid response signal may include the ID number of the station concerned.

As described above, the present invention can automatically set the ID number in all the stations including a repeater station within a communication system, remotely from the centralized supervisory station without requiring a customer engineer's intervention at the site. It can also recognize the number of stations included in the system and the power-on/off state of each station, based on the response signal. Accordingly, the present invention can provide an economical and reliable apparatus and method for setting the ID number in a station included in a communication system and thus, it can cope flexibly with a change in system configuration.

What is claimed is:

1. An apparatus for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-identifying information as previously set in the first station, for controlling the first station and adding control information to the control information signal, said apparatus comprising:

sending means, provided in the second station, for sending to the first station, a control information signal including setting data and a command instructing the station-identifying information be set;

setting means, provided in the first station, for setting the setting data as the station-identifying information based on the control information signal received by the first station; and transfer means, provided in the first station, for transferring the received control information signal to the succeeding first station.

2. An apparatus according to claim 1, wherein said transfer means causes the control signal to bypass said setting means to the succeeding first station when the station-identifying information has already been set.

3. An apparatus according to claim 2, wherein said transfer means is constructed by one of an electrical switch and an electronic switch.

4. An apparatus according to claim 1, wherein said apparatus further comprises indication means, provided in the first station, for sending to the second station, a control information signal indicating completion of setting of the station-identifying information, and wherein, in response to the control information signal sent by said indicating means, said sending means sends the control information signal including the setting data and the command for the succeeding first station.

5. An apparatus according to claim 1, wherein said setting means comprises:

first storage means for storing the station-identifying information; and control means for detecting the control information signal sent by said sending means and storing in said first storage means, the setting data included in the control information signal.

6. An apparatus according to claim 5, wherein said apparatus further comprises:

second storage means, provided in the first station, for retaining its contents in the absence of power, and saving/restoring means, provided in the first station, for saving the station-identifying information from said first storage means to said second storage means when power fails and restoring the information when power is restored.

7. An apparatus for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-identifying information as previously set in the first station, for controlling the first station and adding control information to the control information signal, said apparatus comprising:

sending means, provided in the second station, for sending to the first station, a control information signal including setting data and a command instructing the station-identifying information be set;

operation means, provided in the first station, for performing an operation on the setting data based on the control information signal received by the first station;

setting means, provided in the first station, for setting a result of the operation by said operation means as the station-identifying information; and transfer means, provided in the first station, for transferring a control information signal including the command and the result of the operation by said operation means as the setting data, to the succeeding first station.

8. An apparatus according to claim 7; and further comprising indication means, provided in the first station, for sending to the second station, a control information signal indicating completion of setting the station-identifying information.

9. An apparatus according to claim 7, wherein the setting data included in the received control information signal is a number and the operation performed by said operation means is an addition which add a pre-determined value to the number.

10. An apparatus for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-indentifying information as previously set in the first station, for controlling the first station and adding control information to the control information signal, said apparatus comprising:

sending means, provided in the second station, for sending to the first station, a control information signal including a number and an add command;

addition means, provided in the first station, for adding a predetermined value to the number based on the control information signal received by the first station;

transfer means, provided in the first station, for transferring a control information signal including the add command and a result of the addition by said addition means as the number, to the succeeding first station; and indication means, provided in the first station, for sending to the second station, a control information signal indicating completion of the transferring by said transfer means.

11. A method for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-identifying information as previously set in the first station, for controlling the first station and adding control information to the control information signal, said method comprising the steps of:

(a) in the second station, sending to the first station, a control information signal including setting data and a command instructing the station-identifying information be set;

(b) in the first station, setting the setting data as station-identifying information based on the control information signal received by the first station; and (c) in the first station, transferring the received control information signal to a succeeding first station.

12. A method according to claim 11, wherein said transferring in step (c) causes the control signal to bypass said setting in step (b) to the succeeding first station when the station-identifying information has already been set.

13. A method according to claim 11, and further comprising step (d), in the first station, of sending a control information signal indicating completion of setting of the station-identifying information, to the second station, and wherein, in response to the control information sent in step (d), said sending in step (a) sends the control information signal including the setting data and the command for the succeeding first station.

14. A method according to claim 11, wherein said setting in step (b) comprises:

(e) providing first storage means for storing the station-identifying information; and (f) detecting the control information signal sent in step (a) and storing in the first storage means, the setting data included in the control information signal.

15. A method of claim 14, wherein said method further comprises:

(g) providing in the first station, second storage means for retaining its contents in the absence of power, and (h) in the first station, saving the station-identifying information from said first storage means to said second storage means when power fails and restoring the information when power recovers from a failure.

16. A method for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-identifying information as previously set in the first station, for controlling the first station and adding control information to the control information signal, said method comprising the steps of:

(a) in the second station, sending to the first station, a control information signal including setting data and a command instructing the station-identifying information be set;

(b) in the first station, performing an operation on the setting data based on the control information signal received by the first station;

(c) in the first station, setting a result of the operation in step (b); and (d) in the first station, transferring to the succeeding first station, a control information signal including the command and the result of the operation in step (b).

17. A method according to claim 16, wherein said transferring in step (d) causes the control signal to bypass said setting in step (c) to the succeeding first station when the station-identifying information has already been set.

18. A method according to claim 16; and further comprising step (e), in the first station, of sending a control information signal indicating completion of setting of the station-identifying information to the second station.

19. A method according to claim 16, wherein said setting in step (c) comprises:

(f) providing first storage means for storing the station-identifying information; and (g) detecting the control information signal sent in step (a) and storing in the first storage means, the setting data included in the control information signal.

20. A method according to claim 18, wherein said method further comprises the steps:

(h) providing in the first station, second storage means for retaining its contents in the absence of power, and (i) in the first station, saving the station-identifying information from said first storage means to said second storage means when power fails and restoring the information when power recovers from a failure.

21. A method according to claim 16, wherein the setting data included in the received control information signal is a number and said performing the operation in step (b) is adding a pre-determined value to the number.

22. A method for setting station-identifying information in a first station of a communication system including a second station and a plurality of the first stations connected in series, the second station interchanging control information signal including station-identifying information with one of the first stations, the first stations interchanging the control information signal and being each responsive to the control information signal including the same station-identifying information as previously set in the station, for controlling the station and adding control information to the control information signal, said method comprising the steps of:

(a) in the second station, sending to the first station, a control information signal including a number and an add command;

(b) in the first station, adding a pre-determined value to the number based on the control information signal received by the first station;

(c) in the first station, transferring to the succeeding first station, a control information signal including the add command and a result of the addition in step (b) as the number; and (d) in the first station, sending to the second station, a control information signal indicating completion of transfer in step (c).

* * * * *